US010941227B2

(12) United States Patent
Banat

(10) Patent No.: US 10,941,227 B2
(45) Date of Patent: Mar. 9, 2021

(54) GAS PHASE OLEFINS POLYMERIZATION PROCESS OPERATING IN CONDENSING MODE

(71) Applicant: SABIC Global Technologies B.V., Bergen op Zoom (NL)

(72) Inventor: Yahya Banat, Geleen (NL)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 239 days.

(21) Appl. No.: 16/065,893

(22) PCT Filed: Dec. 29, 2016

(86) PCT No.: PCT/EP2016/082892
§ 371 (c)(1),
(2) Date: Jun. 25, 2018

(87) PCT Pub. No.: WO2017/114930
PCT Pub. Date: Jul. 6, 2017

(65) Prior Publication Data
US 2019/0010261 A1  Jan. 10, 2019

(30) Foreign Application Priority Data
Dec. 30, 2015 (EP) .................................. 15203215

(51) Int. Cl.
C08F 210/16 (2006.01)
C08F 210/02 (2006.01)
C08F 2/34 (2006.01)
C08F 210/06 (2006.01)

(52) U.S. Cl.
CPC .......... *C08F 210/02* (2013.01); *C08F 210/06* (2013.01)

(58) Field of Classification Search
CPC ............. C08F 2/34; C08F 2/01; C08F 210/16
See application file for complete search history.

(56) References Cited

U.S. PATENT DOCUMENTS

| 3,450,183 A | 6/1969 | Hinton |
| 3,594,356 A | 7/1971 | Hinton |
| 4,197,399 A | 4/1980 | Noel et al. |
| 4,372,758 A | 2/1983 | Bobst et al. |
| 4,543,399 A * | 9/1985 | Jenkins, III ............ B01J 8/1809 526/68 |
| 4,588,790 A * | 5/1986 | Jenkins, III ............ B01J 8/1809 526/70 |
| 5,352,749 A * | 10/1994 | DeChellis ............... C08F 10/00 526/68 |
| 5,391,656 A | 2/1995 | Campbell et al. |
| 5,405,922 A * | 4/1995 | DeChellis ............. B01J 8/1827 526/68 |
| 6,576,043 B2 | 6/2003 | Zwilling et al. |
| 6,706,857 B2 | 3/2004 | Golden et al. |
| 6,759,489 B1 | 7/2004 | Turkistani |
| 6,828,395 B1 * | 12/2004 | Ehrman .................. C08F 10/00 525/191 |
| 8,669,334 B2 * | 3/2014 | Banat ..................... C08F 10/00 526/68 |
| 9,023,958 B2 * | 5/2015 | Wright ...................... B01J 7/00 526/88 |
| 9,221,937 B2 * | 12/2015 | Savatsky ................... C08F 2/34 |
| 9,975,968 B2 * | 5/2018 | Banat ...................... B01J 19/06 |
| 10,471,405 B2 * | 11/2019 | Althukair .................. B01J 8/20 |
| 10,745,499 B2 * | 8/2020 | Banat ..................... C08F 110/06 |
| 2005/0137364 A1 * | 6/2005 | Cai ....................... C08F 210/16 526/68 |
| 2005/0182207 A1 | 8/2005 | Singh et al. |
| 2015/0183905 A1 | 7/2015 | Savatsky et al. |

FOREIGN PATENT DOCUMENTS

WO  2011147539 A1  12/2011

OTHER PUBLICATIONS

International Search Report for International Application No. PCT/EP2016/082892; dated Mar. 27, 2017; 4 pages.
Written Opinion of the International Search Report for International Application No. PCT/EP2016/082892; dated Mar. 27, 2017; 5 pages.

* cited by examiner

*Primary Examiner* — Rip A Lee
(74) *Attorney, Agent, or Firm* — Cantor Colburn LLP

(57) ABSTRACT

The present invention concerns a process for the gas phase polymerization of at least one alpha-olefin comprising: polymerizing at least one alpha-olefin in a fluidized bed reactor with a polyolefin purging unit and a vent gas recovery system, wherein the fluidized bed reactor operates in a condensed mode or super condensed mode with a recycle stream comprising one or more alkane(s) having 3 to 5 C atoms, wherein further at least one additional alkane with 6 to 12 C atoms is added to the recycle stream in an amount so that it represents between 0.0095 mol. % and 7,0000 mol. % of the recycle stream composition introduced into the reactor.

12 Claims, No Drawings

GAS PHASE OLEFINS POLYMERIZATION PROCESS OPERATING IN CONDENSING MODE

CROSS REFERENCE TO RELATED APPLICATIONS

This application is a 371 of International Application No. PCT/EP2016/082892, filed Dec. 29, 2016, which claims priority to European Application No. 15203215.7 filed Dec. 30, 2015, both of which are incorporated herein by reference in their entirety.

The present invention thus concerns a process for the gas phase polymerization of at least one alpha-olefin comprising: polymerizing at least one alpha-olefin in a fluidized bed reactor with a polyolefin purging unit and a vent gas recovery system, wherein the fluidized bed reactor operates in a condensed mode or super condensed mode with a recycle stream comprising one or more alkane(s) having 3 to 5 C atoms,
wherein further at least one additional alkane with 6 to 12 C atoms is added to the recycle stream in an amount so that it represents between 0.0095 mol. % and 7.0000 mol. % of the recycle stream composition introduced into the reactor.

Gas phase fluidized bed reactors for the production of olefin polymers are thereby well known in the art. Gas phase processes successfully allow for production of a vast array of polymers, while reducing energy requirements and capital investments required to run the gas phase processes as compared to other polymerization processes.

Compounds that escape with the resin out of the reactor are thereby preferably recovered and reintroduced into the reaction system to achieve efficient use of feedstocks.

Modern production plants are therefore often designed with elaborate recovery schemes for this purpose. Corresponding vent gas recovery (VGR) system can thereby be called the VGR or the VGR system.

Furthermore, for safety reasons, entrained and adsorbed reactor gas must be removed from the product polymer powder before the product is conveyed on to storage or further processing to preclude forming explosive gas mixtures.

Otherwise, for example remaining monomers and/or other hydrocarbons, such as for example alkanes, may diffuse out of the product polymer powder, especially in downstream vessels which contain air, and form explosive gas mixtures.

To prevent this as much as possible, a purging can be performed for example in a product purge tank for example by blowing a stream of nitrogen up from the bottom of the purge tank through and against the polymer introduced therein. This can flush out entrained reactor gas and strips as well as desorbs dissolved hydrocarbons out of the product powder.

The vent recovery system recovers as much compounds, especially hydrocarbons, as possible from the streams sent to it. Recovered condensed compounds can then for example be returned directly to the reaction system, while recovered light gases can for example be used as a conveying gas to reduce nitrogen consumption.

The (co)monomers lost in product vent stream can represent a substantial loss to polyolefin producers. Also, there is the continually rising requirements of disposing of the vent gas to meet air quality protection codes and legislation. Typically, for example from about one to about two percent of the ethylene fed to the process is lost in the vent gas stream. Comonomer losses can even be much higher ranging for example from about 10% for butene-1 to about 50% for hexene-1. The fraction of comonomer that is lost in the vent gas stream can thereby increase with molecular weight of the comonomer because the solubility of comonomer in the product polyolefin increases with the molecular weight of the comonomer.

Accordingly, are various techniques for removing volatile compounds, especially for example monomers and/or inert hydrocarbons, such as alkanes, from polymers.

U.S. Pat. No. 4,372,758 discloses a degassing or purging process for removing compounds such as from solid olefin polymers. The purging process generally comprises conveying the solid polymer (e.g., in granular or powder form) to a polymer purge bin and contacting the polymer in the purge bin with a countercurrent gas purge stream to strip away the hydrocarbon gases and/or other compounds from the polymer. Most commonly, the whole purging is done with an inert gas such as nitrogen. However, it is also possible to use a light hydrocarbon rich gas to strip the heavier hydrocarbons in a first stage and then use an inert gas in a second stage for the comparatively easy task of stripping the light hydrocarbons that remain in and around the resin after the first stage.

U.S. Pat. Nos. 4,197,399, 3,594,356, and 3,450,183, all describe a columnar (or straight cylindrical) vessel is used as a purger, referred to as a polymer purge bin, or product purge bin.

U.S. Pat. No. 5,391,656 describes a compression and condensation system where a polymer purge bin vent stream, which contains inert gases, such as nitrogen, and various monomers, is treated in a series of steps that include: cooling to condense a portion of the reactor gas stream; separating the condensed liquids from the remaining non-condensable gases; compressing the non-condensable gases; cooling the compressed stream to promote further condensing, further liquid/gas separation, and further recycle of condensed monomers. The compression and cooling vent recovery system provide recovery of a high percentage of the heavier contained hydrocarbons, for example butene, iso-pentane, hexene, hexane, and other heavy alkenes and alkanes, through the condensation process.

U.S. Pat. No. 6,576,043 describes a process for the separation of a gas mixture comprising nitrogen and at least one hydrocarbon from a polyethylene or polypropylene production plant in which nitrogen is utilized to purge solid particles of polymer product. The gas mixture is separated in an adsorbent bed by a Pressure Swing Adsorption (PSA) process U.S. Pat. No. 6,706,857 describes a process that also uses a PSA in which the monomer is adsorbed on a periodically regenerated silica gel or alumina adsorbent to recover a purified gas stream containing the olefin and a nitrogen rich stream.

There is thus obviously an ongoing effort and need for improving the recovering compounds, such as for examples unreacted monomers and/or inert hydrocarbons, from produced polymer materials.

It is the object of the present invention to provide a method for operating a fluidized bed polymerization reactor in condensed or super condensed mode that greatly improves the recovery of compounds such as hydrocarbons and/or monomers from the produced polymer material.

This is done by a process according to claim 1. Further embodiments are described in the dependent claims as well as in the following description.

The present invention thus concerns a process for the gas phase polymerization of at least one alpha-olefin comprising: polymerizing at least one alpha-olefin in a fluidized bed reactor with a polyolefin purging unit and a vent gas recovery system, wherein the fluidized bed reactor operates in a condensed mode or super condensed mode with a recycle stream comprising one or more alkane(s) having 3 to 5 C atoms,
wherein further at least one additional alkane with 6 to 12 C atoms is added to the recycle stream in an amount so that it represents between 0,0095 mol. % and 7,0000 mol. % of the recycle stream composition introduced into the reactor.

The inventors thereby found that the process according to the invention can improve efficiency of the vent gas recovery system VGR significantly by adding even traces of an alkane with 6 to 12 C atoms.

In one embodiment an alkane with 6 to 12 C atoms may be added to the recycle stream in an amount so that it represents for example between 0,0095 mol. % and 7,0000 mol. %, preferably between 0,0100 mol. % and 0.5000 mol. %, especially for example between between 0,0095 mol. % and 3,0000 mol. %, preferably between >0,0095 mol. % and 3,0000 mol. %, preferably between 0,0100 mol. % and <3,0000 mol. %, preferably between 0,0095 mol. % and 1,0000 mol. %, preferably between >0,0095 mol. % and <1,0000 mol. %, preferably between 0,0100 mol. % and 1,0000 mol. %, preferably between 0,0100 mol. % and <1,0000 mol. %, preferably between 0,0100 mol. % and 0,6000 mol. %, preferably between 0,0100 mol. % and 0,5000 mol. %, preferably between >0,0100 mol. % and <0,5000 mol. %, preferably between 0,1000 mol. % and <0,5000 mol. % or between >0,1000 mol. % and <0,5000 mol. %, preferably between 0,0100 mol. % and <0,3000 mol. % or between >0,1000 mol. % and <0,3000 mol. %, of the composition of the recycle stream introduced to the reactor.

The present invention can thereby be used especially when one or more alkanes with 3 to 5 C atoms, such as for example iso-pentane, cyclopentane, n-butane, iso-butane and/or a mixture thereof are used for example as condensing agents.

According to the invention, adding at least one heavier hydrocarbons with between 6 and 12 C atoms, such as for example n-hexane, n-octane, the recycle stream in an amount so that it represents between 0.0095 mol. % and 7 mol. % of the recycle stream composition aiming at improves the performance of the vent recovery system.

In general, polymerization reactions are exothermic. Therefore, producing a polymer in a fluidized bed reactor necessitates that the heat generated by the polymerization reaction is removed in order to keep the reaction temperature within the bed in a desirable range.

One way of maximizing cooling throughout the reaction zone is by evaporative cooling or operating in condensed mode or super condensed mode. This can be achieved by the addition to the fluidized bed reactor of at least preferably inert condensing agent, such as especially for example at least one alkane with 3 to 5 C atoms, and cooling the recycle stream to a temperature below its dew point, hence the condensation of a fraction of said recycle stream, preferably condensing at least a portion of the at least one condensing agent.

In this process, fluid is formed by cooling the recycle stream below the dew point temperature, thereby converting a portion of the gas into a liquid, and the cooled recycle stream is introduced into the fluidized bed polymerization reactor together with the obtained liquid, which may preferably be a liquefied portion of the at least one condensing agent.

The liquid can thereby vaporize when it is exposed to the heat in the reactor. The objective is to take advantage of the cooling effect brought about by the vaporization. The liquid phase is provided by a portion of the recycle gases, which includes monomers and low boiling alkanes, inert to the reaction conditions needed for polymerization, and condensation from which the condensed mode gets his name.

Condensed mode fluidized bed reactor polymerization processes have been disclosed for example in U.S. Pat. Nos. 4,543,399 and 4,588,790, each of which describes introducing an inert liquid into the recycle stream to increase the dew point temperature of the recycle stream and allowing the process to operate at levels of up to 17.4% liquid by weight, based on the total weight of the recycle stream introduced into the reactor.

A condensed mode process is considered to be advantageous because its ability to remove greater quantities of heat generated by polymerization increases the polymer production capacity of a fluidized bed polymerization reactor.

Commonly used condensing agents are one or more alkane(s) which is/are inert in polymerization conditions. For example iso-pentane, which boils at about 27 degrees C., and consequently is vapor in the recycle line in view of the heat present in the recycle gases can be used as a condensing agent.

The recycle gases thereby leave the reactor, are cooled, and then condensed to the extent that a vapor phase and liquid phase are formed.

Moreover, "super condensed mode" fluidized bed reactor polymerization processes operating with above 17.4% liquid by weight in the recycle stream introduced into the reactor have been disclosed; however, such processes must be confined under certain more specific and restrictive conditions within a limited range of operating conditions to avoid destabilizing the fluidized bed, thereby halting the process. For example, U.S. Pat. No. 5,352,749 describes such a process.

The inventors have surprisingly found that adding even a low amount of a heavier alkane with 6 to 12 C atoms to the recycle stream can improve the vent gas recovery system efficiency for example by more than 75% compared to the use of only one or more alkane(s) with 3 to 5 C atoms as condensing agent(s) in the recycle stream at the same production rate and/or compared to the efficiency without adding at least one additional alkane with 6 to 12 C atoms to the recycle stream at the same production rate and/or with otherwise identical operating conditions. The expression C atoms may thereby refer to carbon atoms.

Such improvement significantly contributes to a very efficient achieve use of feedstocks since the feedstock. Moreover, it may also help to meet the continually rising requirements for disposing of the vent gas to meet air quality protection codes and legislation.

A vent gas recovery (VGR) system can thereby typically be used to recover hydrocarbons, such as for example alkanes and/or alkenes, especially one or more alpha-olefins, from the mixed hydrocarbon/inert purge gas stream that exits the purging unit.

The purging unit may thereby be for example a vertical vessel where purge gas such as for example an inert gas like nitrogen, $CO_2$, argon or a gas of light hydrocarbons with 3 to 5 C atoms is sent from the bottom of the vessel to the top against the flow of the polymer coming from the reactor to strip away hydrocarbons, such as for example alkanes and/or alkenes, especially one or more alpha-olefins from the polymer. The stream comprising a mixture of (a) hydrocarbon(s) and an inert purge gas coming out of the purging unit is fed to the vent gas recovery (VGR) system to recover hydrocarbons, such as for example alkanes and/or alkenes, especially one or more alpha-olefins, from the mixed hydrocarbon/inert purge gas stream that exits the purging unit. Inert in the sense of the present invention may thereby mean for example that does not interfere with the polymerization and/or that does not comprise a polymerizabe double bond. The stream of gas and hydrocarbons that leaves the purging unit and may be introduce to the vent gas recovery system can thereby be called purge stream.

Methods of recovering hydrocarbons from the stream exiting the purging unit used in a vent gas recovery (VGR) system can thereby include for example: a) a compression and condensation method, especially relying on condensation by cooling with water and/or air and/or with mechanical refrigeration (especially for example by cooling to −10° C.); and/or b) a separation method via pressure swing absorption (PSA) and/or membranes; and/or c) a cryogenic vent recovery method, wherein condensation of monomer from the purge stream is accomplished by cooling with a liquefied gas, such as for example liquid nitrogen, especially by for example by vaporization of the liquefied gas and/or of liquid nitrogen.

Methods that use only option a) can recover most of the hydrocarbons with 4 or more C atoms, which may be present in the feeds as impurities, but will typically recover at most only up to 50% of the hydrocarbons with 3 C atoms, such as especially ethylene and/or propylene. Furthermore, the uncondensed nitrogen contains significant amounts of heavy hydrocarbons, which may preclude using it as a resin drying or purge gas. To reach a higher ethylene recovery and achieve a higher recovered gas quality, further vent recovery processing is required.

In an embodiment of the present invention, especially the recovery of alkanes with 3 to 5 C atoms may be improved, particularly for example compared to the use of only one or more alkane(s) with 3 to 5 C atoms as condensing agent(s) in the recycle stream at the same production rate and/or compared to the recovery of alkanes with 3 to 5 C atoms without adding at least one additional alkane with 6 to 12 C atoms to the recycle stream at the same production rate and/or with otherwise identical operating conditions. In an embodiment of the present invention, especially the recovery of the recovery of one or more alpha-olefins, especially for example ethylene and/or propylene and/or 1-hexene may be improved, particularly for example compared to the use of only one or more alkane(s) with 3 to 5 C atoms as condensing agent(s) in the recycle stream at the same production rate and/or compared to the recovery of one or more alpha-olefins without adding at least one additional alkane with 6 to 12 C atoms to the recycle stream at the same production rate and/or with otherwise identical operating conditions. This allows to use feedstock very efficiently.

In an embodiment, the catalyst used in the process according to the invention may be for example a chromium based catalyst system, preferably of the Ziegler-Natta type, and/or metallocene based catalyst systems and/or a prepolymer powder.

In an embodiment of the present invention, the amount of liquids (for example in kg/hr) recovered, especially for example in the VGR system, may be increased by at least 50%, preferably at least 75%, particularly for example compared to the use of only one or more alkane(s) with 3 to 5 C atoms as condensing agent(s) in the recycle stream at the same production rate and/or compared to the liquids recovered without adding at least one additional alkane with 6 to 12 C atoms to the recycle stream at the same production rate and/or with otherwise identical operating conditions.

That at least one additional alkane with 6 to 12 C atoms is added to the recycle stream in the sense of the present invention may thereby mean for example that the at least one additional alkane with 6 to 12 C atoms may be added to the recycle stream preferably in addition to any traces of alkanes with 6 to 12 C atoms that may be present in the various streams fed to the reactor.

According to the invention, the at least one additional alkane with 6 to 12 C atoms may thus be added to the recycle stream preferably in addition to any traces of alkanes with 6 to 12 C atoms that may be present in the various streams fed to the reactor.

The present invention also concerns the use of a process according to the invention for producing polymers or copolymers of ethylene or propylene optionally with at least one other alpha-olefin as comonomer.

The present invention furthermore concerns, the use of a at least one alkane with 6 to 12 C in a process for the gas phase polymerization of at least one alpha-olefin, preferablyfor example according to the invention, comprising: polymerizing at least one alpha-olefin in a fluidized bed reactor with a polyolefin purging unit and a vent gas recovery system, wherein the fluidized bed reactor operates in a condensed mode or super condensed mode with a recycle stream comprising one or more alkane(s) having 3 to 5 C atoms, so as to improve the amount of liquids recovered in the VGR system, especially for example the amount of alkanes with 3 to 5 C atoms and/or the amount of one or more alpha-olefins, such as for example ethylene and/or propylene and/or 1-hexene, particularly for example compared to the use of only one or more alkane(s) with 3 to 5 C atoms as condensing agent(s) in the recycle stream at the same production rate and/or compared to the amount of liquids without adding at least one additional alkane with 6 to 12 C atoms to the recycle stream at the same production rate and/or with otherwise identical operating conditions.

EXAMPLE

Polymerization of ethylene with 1-hexene has been carried out in a fluidized bed reactor under the conditions below in Table 1 with a recycle stream composition of 69,4600 mol. % ethylene, 0,1500 mol. % CxH2x, 1,2400 mol. % hydrogen, 11,1500 mol. % total 5 C compounds, 15,7400 mol % nitrogen, 0,5200 mol. % ethane, 0.0100 mol. % n-butane and a cycle gas flow rate of 1231.33 T/hr.

TABLE 1

| Comonomer | CG Mole Ratio H2/C2 | CG Mole Ratio Cx/C2 | Reactor Temperature T (° C.) | Reactor Pressure P (barg) |
| --- | --- | --- | --- | --- |
| Hexene | 0.0179 | 0.0021 | 99.3 | 22.99 |

The amount of recovered liquids was estimated as indicated in Table 2 below.

TABLE 2

|  |  | Vent Gas Purge Bin | Recovered Liq | Gas-out | % Recovery |
| --- | --- | --- | --- | --- | --- |
| ETHYLENE | KG/HR | 594 | 20 | 574 | 3.40 |
| HEXANE | KG/HR | 125 | 118 | 7 | 94.67 |
| H2 | KG/HR | 0 | 0 | 0 | 0.06 |

TABLE 2-continued

|  |  | Vent Gas Purge Bin | Recovered Liq | Gas-out | % Recovery |
|---|---|---|---|---|---|
| N2 | KG/HR | 4063 | 7 | 4057 | 0.17 |
| 1-HEXENE | KG/HR | 7 | 6 | 0 | 93.05 |
| BUTENE | KG/HR | 0 | 0 | 0 |  |
| ISOPENTA | KG/HR | 748 | 562 | 186 | 75.18 |
| N-BUTANE | KG/HR | 0 | 0 | 0 |  |
| METHANE | KG/HR | 0 | 0 | 0 | 0.71 |
| ETHANE | KG/HR | 21 | 1 | 19 | 5.33 |

All other relevant operating conditions kept identical, upon the addition of 0,2500 mol. % of n-hexane as at least one additional alkane with 6 to 12 C atoms, to the recycle stream, the amount of recovered liquids was estimated as indicated in Table 3 below.

This shows an improvement regarding the amount of recovered liquids.

TABLE 3

|  |  | Vent Gas Purge Bin | Recovered Liq | Gas-out | % Recovery |
|---|---|---|---|---|---|
| ETHYLENE | KG/HR | 636 | 61 | 575 | 9.62 |
| HEXANE | KG/HR | 627 | 623 | 4 | 99.32 |
| H2 | KG/HR | 0 | 0 | 0 | 0.20 |
| N2 | KG/HR | 1716 | 9 | 1707 | 0.54 |
| 1-HEXENE | KG/HR | 24 | 23 | 0 | 98.98 |
| BUTENE | KG/HR | 0 | 0 | 0 |  |
| ISOPENTA | KG/HR | 1133 | 1047 | 86 | 92.41 |
| N-BUTANE | KG/HR | 0 | 0 | 0 |  |
| METHANE | KG/HR | 12 | 0 | 12 | 2.17 |
| ETHANE | KG/HR | 66 | 10 | 57 | 14.53 |
| I-BUTANE | KG/HR | 0 | 0 | 0 |  |
| Total |  | 4215 | 1774 |  |  |

The invention claimed is:

1. A process for the gas phase polymerization of at least one alpha-olefin comprising:
   polymerizing at least one alpha-olefin in a fluidized bed reactor with a polyolefin purging unit and a vent gas recovery system, wherein the fluidized bed reactor operates in a condensed mode or super condensed mode with a recycle stream comprising one or more alkane(s) having 3 to 5 C atoms,
   wherein further at least one additional alkane with 6 to 12 C atoms is added to the recycle stream in an amount so that it represents between 0.0100 mole % to 0.5000 mole % of a recycle stream composition introduced into the fluidized bed reactor.

2. A process for the gas phase polymerization of at least one alpha-olefin according to claim 1, wherein at least one additional alkane with 6 to 12 C atoms is added to the recycle stream in an amount so that it represents between 0.1000 mol. % to 0.5000 mole % of the recycle stream composition introduced into the fluidized bed reactor.

3. A process for the gas phase polymerization of at least one alpha-olefin according to claim 1, wherein at least one additional alkane with 6 C atoms is added to the recycle stream in an amount so that it represents 0.1000 mol. % to 0.3000 mole % of the recycle stream composition introduced into the fluidized bed reactor.

4. A process for the gas phase polymerization of at least one alpha-olefin according to claim 1, wherein at least one additional alkane with 6 to 12 C atoms is added to the recycle stream in addition to any traces of alkanes with 6 to 12 C atoms that may be present in various streams fed to the fluidized bed reactor.

5. A process for the gas phase polymerization of at least one alpha-olefin according to claim 1, wherein at least one additional alkane is n-hexane.

6. A process for the gas phase polymerization of at least one alpha-olefin according to claim 1, wherein recovery of alkanes with 3 to 5 C atoms is improved compared particularly for example compared to the use of only one or more alkane(s) with 3 to 5 C atoms as condensing agent(s) in the recycle stream at the same production rate and/or compared to the recovery of alkanes with 3 to 5 C atoms without adding at least one additional alkane with 6 to 12 C atoms to the recycle stream at the same production rate and with otherwise identical operating conditions.

7. A process for the gas phase polymerization of at least one alpha-olefin according to claim 1, wherein recovery of at least one alpha-olefin is improved compared to the recovery of at least one alpha-olefin without adding at least one additional alkane with 6 to 12 C atoms to the recycle stream at the same production rate and/or with otherwise identical operating conditions.

8. A process for the gas phase polymerization of at least one alpha-olefin according to claim 1, wherein an amount of liquids recovered is increased by at least 50%.

9. The process for the gas phase polymerization of at least one alpha-olefin according to claim 8, wherein the amount of liquids recovered is increased by at least 75%.

10. A process for the gas phase polymerization of at least one alpha-olefin according to claim 1, wherein the polymerizing occurs in the presence of a catalyst, wherein the catalyst is a chromium based catalyst, and/or a metallocene based catalyst and/or a prepolymer powder.

11. A process for the gas phase polymerization of at least one alpha-olefin according to claim 1, wherein the at least one alpha-olefin is ethylene or propylene, optionally with at least one other alpha-olefin as comonomer.

12. A process for the gas phase polymerization of at least one alpha-olefin comprising
   polymerizing at least one alpha-olefin in a fluidized bed reactor with a polyolefin purging unit and a vent gas recovery system, wherein the fluidized bed reactor operates in a condensed mode or super condensed mode with a recycle stream comprising one or more alkane(s) having 3 to 5 C atoms, wherein the polymerizing occurs in the presence of a catalyst, wherein the catalyst is a chromium based catalyst;
   wherein further at least one additional alkane with 6 to 12 C atoms is added to the recycle stream in an amount so that it represents 0.0095 mole % to 7.0000 mole % of a recycle stream composition introduced into the fluidized bed reactor.

* * * * *